US007641122B2

United States Patent
Shin et al.

(10) Patent No.: US 7,641,122 B2
(45) Date of Patent: Jan. 5, 2010

(54) MOBILE DEVICE HAVING AN IC CARD FUNCTION

(75) Inventors: Takahiro Shin, Kawasaki (JP); Kenetsu Furuki, Kawasaki (JP); Yoshihiro Ono, Kanagawa (JP); Shinichiro Inui, Kato-gun (JP); Takayuki Ebara, Kawasaki (JP); Yuko Nakajima, Kawasaki (JP); Hideaki Watanabe, Kawasaki (JP); Wataru Hamada, Kawasaki (JP); Hideyuki Nagasawa, Yokohama (JP); Naoki Naruse, Yokohama (JP); Hisashi Yoshinaga, Yokohama (JP)

(73) Assignees: Fujitsu Limited, Kawasaki (JP); NTT DoCoMo, Inc., Tokyo (JP)

( * ) Notice: Subject to any disclaimer, the term of this patent is extended or adjusted under 35 U.S.C. 154(b) by 440 days.

(21) Appl. No.: 10/971,095

(22) Filed: Oct. 25, 2004

(65) Prior Publication Data

US 2005/0224587 A1 Oct. 13, 2005

(30) Foreign Application Priority Data

Apr. 8, 2004 (JP) ............................. 2004-114188

(51) Int. Cl.
*G06K 19/06* (2006.01)
(52) U.S. Cl. ................................ 235/492; 235/472.01
(58) Field of Classification Search ................. 235/439, 235/472.01–472.03, 492; 455/558
See application file for complete search history.

(56) References Cited

U.S. PATENT DOCUMENTS 4,395,767 A * 7/1983 Van Brunt et al. ........... 714/736

| 5,092,799 | A | * | 3/1992 | Kimura ........................ 439/60 |
| 5,623,552 | A | * | 4/1997 | Lane ........................... 382/124 |
| 5,889,866 | A | | 3/1999 | Cyras et al. |
| 5,894,423 | A | * | 4/1999 | Ling et al. ................... 700/293 |
| 2001/0017584 | A1 | | 8/2001 | Shinzaki |
| 2003/0006280 | A1 | | 1/2003 | Seita et al. |
| 2003/0045328 | A1 | | 3/2003 | Natsuno |
| 2003/0174839 | A1 | | 9/2003 | Yamagata et al. |
| 2004/0064698 | A1 | | 4/2004 | Zhang |
| 2006/0183516 | A1 | * | 8/2006 | Ham .......................... 455/575.3 |

FOREIGN PATENT DOCUMENTS

| EP | 0 803 830 A1 | 10/1997 |
| JP | 07-141069 A | 6/1995 |
| JP | 11-177682 | 7/1999 |
| JP | 2001-168980 A | 6/2001 |
| JP | 2001-297315 | 10/2001 |
| JP | 2003-016398 | 1/2003 |

(Continued)

OTHER PUBLICATIONS

European Office Action dated Aug. 29, 2005.

(Continued)

*Primary Examiner*—Seung H Lee
(74) *Attorney, Agent, or Firm*—Westerman, Hattori, Daniels & Adrian, LLP

(57) ABSTRACT

To provide a technology for making it possible to control enable/disable of an IC card function provided in a mobile device. A mobile device including an IC card unit for executing an IC card function, and a communication unit for carrying out communication through a radio telephone line detects a voltage of a battery unit for supplying an electric power to each of the IC card unit and the communication unit, judges whether or not the IC card function can be used in accordance with the detected voltage value, and issues an enable/disable instruction to the IC card unit in accordance with the Judgment results.

33 Claims, 14 Drawing Sheets

FOREIGN PATENT DOCUMENTS

| | | |
|---|---|---|
| JP | 2003-132029 A | 5/2003 |
| JP | 2003-242428 A | 8/2003 |
| JP | 2003-250183 | 9/2003 |

OTHER PUBLICATIONS

European Patent Office Action dated Nov. 16, 2005, corresponding to European Application No. 04256551.

Japanese Office Action dated Mar. 25, 2008, Application No. 2004-114188.

Japanese Office Action dated Aug. 26, 2008, Application No. 2004-114188.

Japanese Notice of Reason for Rejection dated Sep. 8, 2009, issued in corresponding Japanese patent application No. 2008-137246.

* cited by examiner

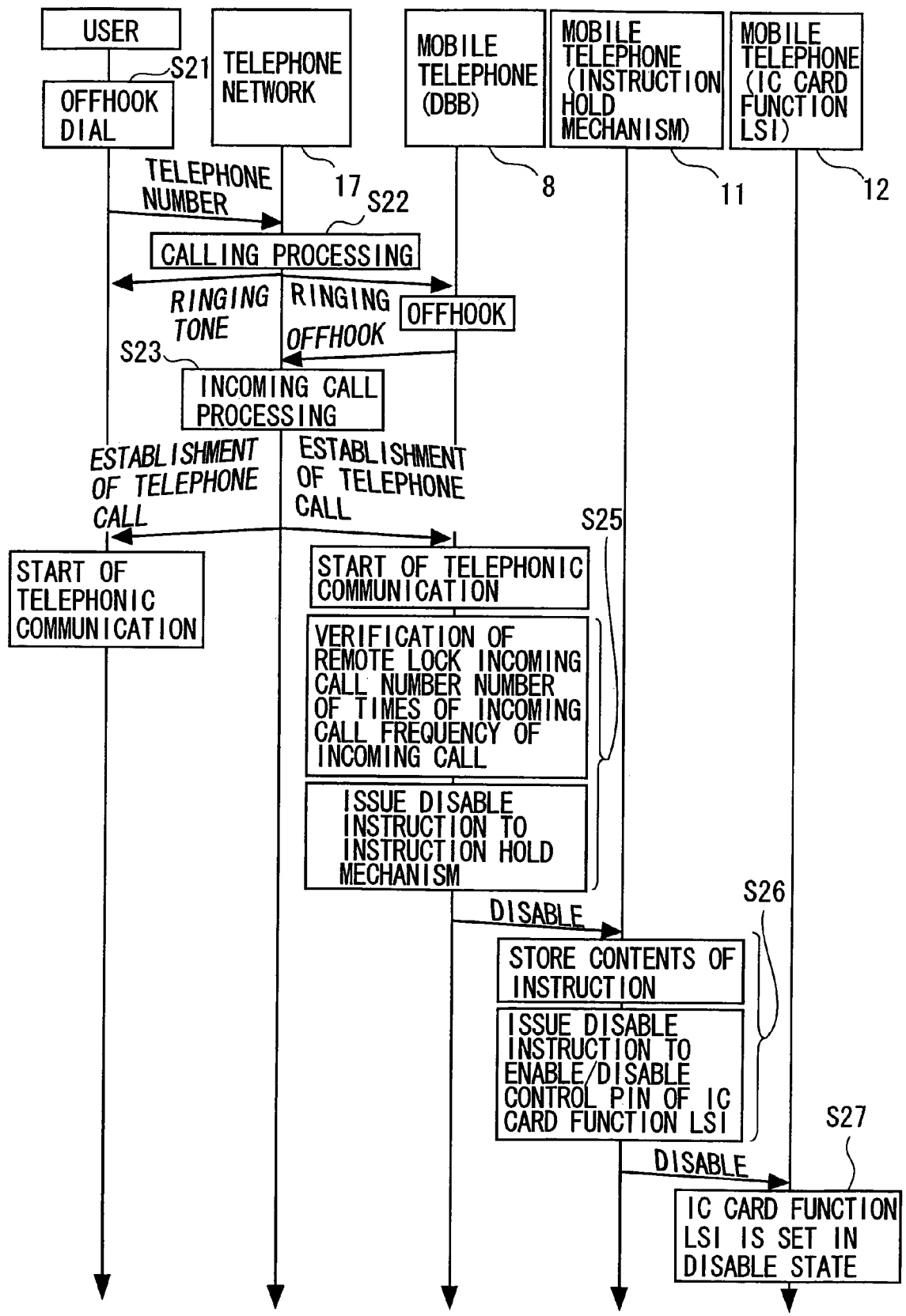

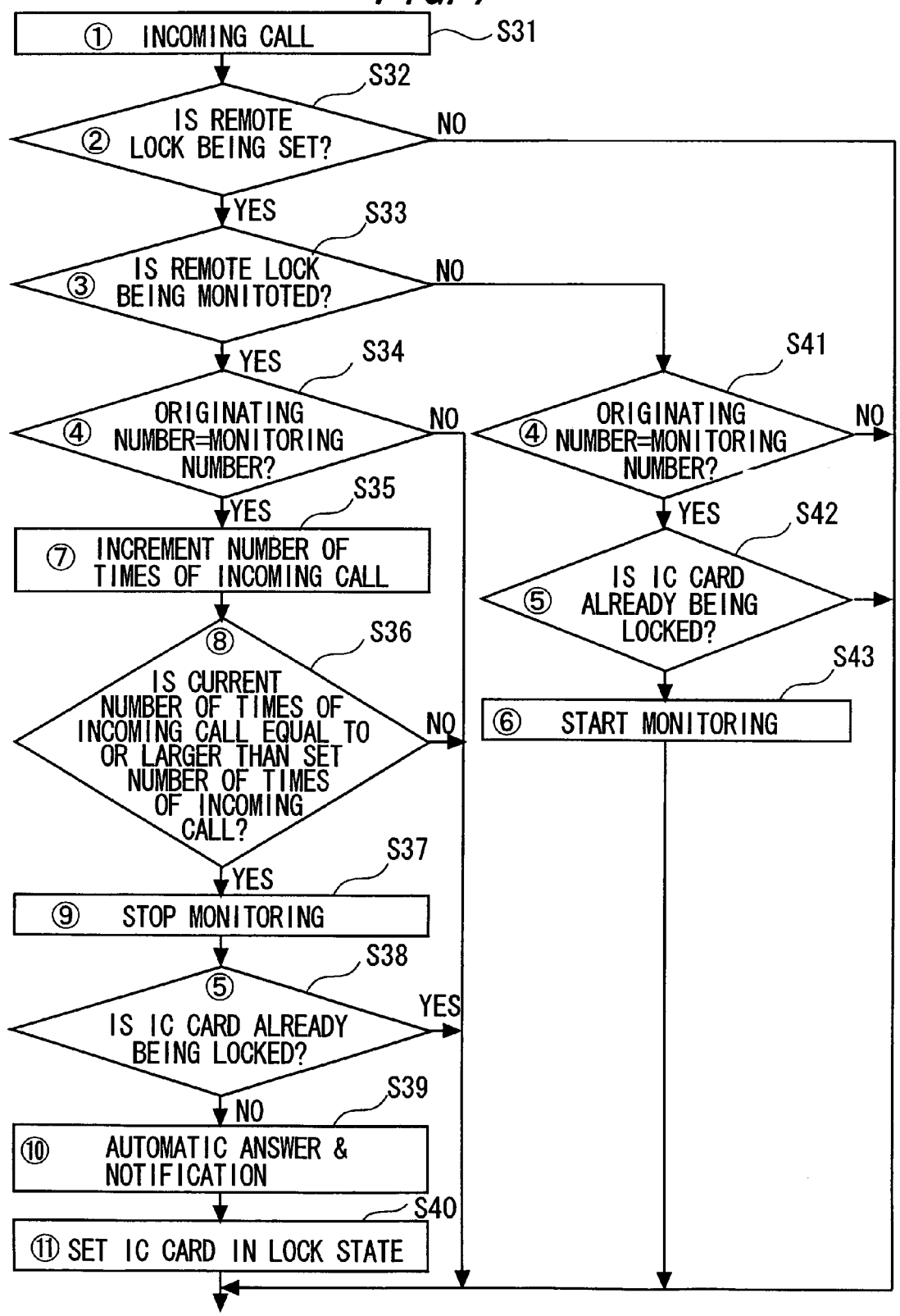

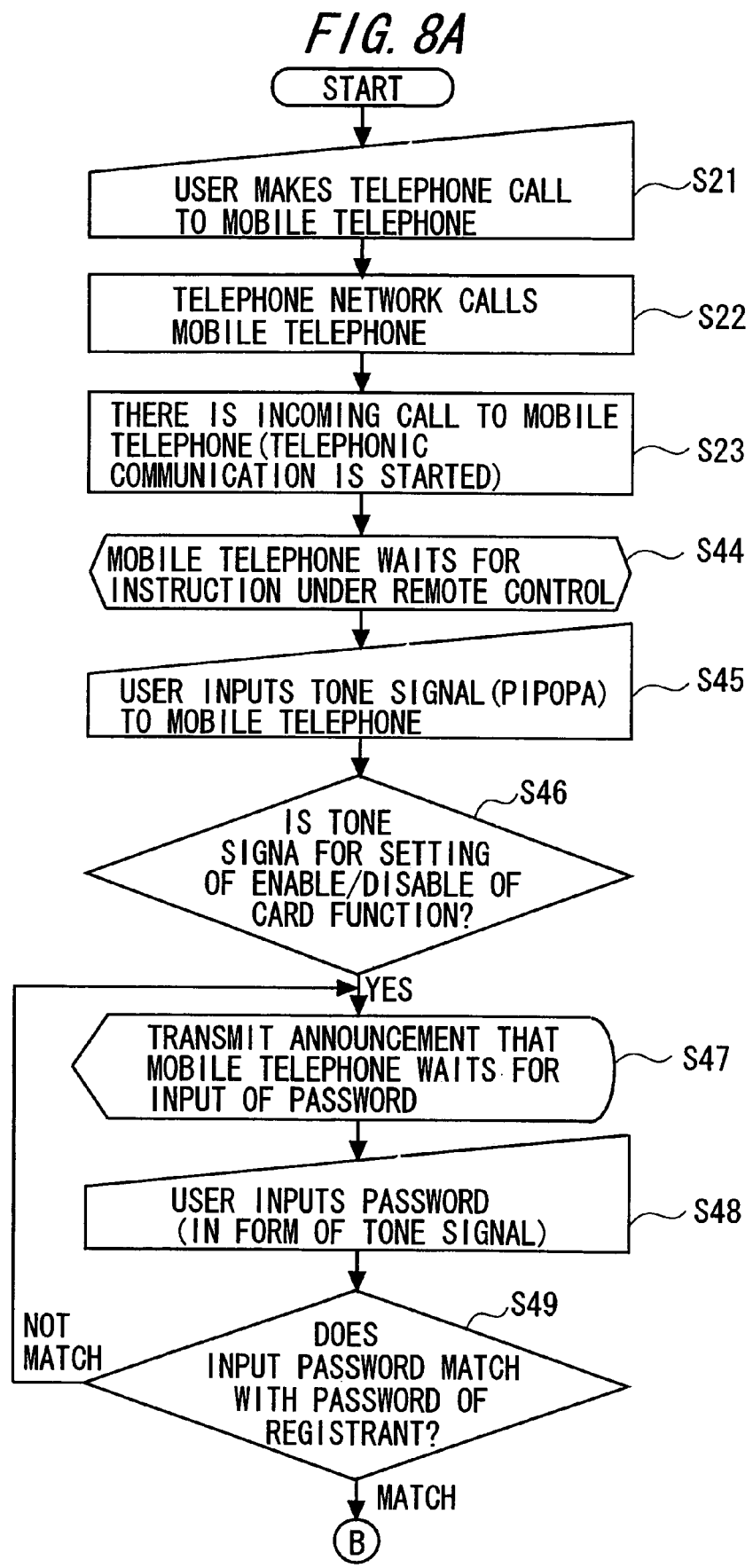

FROM FIG 9A

MOBILE DEVICE HAVING AN IC CARD FUNCTION

BACKGROUND OF THE INVENTION

The present invention relates to a technology for controlling a function of an IC card provided in a mobile terminal.

In recent years, IC cards are becoming widely used instead of conventional magnetic cards. The IC card includes an IC chip provided therein, so the IC card can store therein much information and also execute a simple processing. Therefore, application of the IC card to various services is expected.

For example, it is proposed to provide the IC card function to a mobile device such as a mobile telephone or a watch, and to utilize the mobile device as a commutation ticket for a train, a prepaid card, a ticket for an event, an ID card, or the like.

Thus, providing the IC card function to the mobile telephone, the watch, or the like offers such merits that a power supply and an interface can be used in common, and services of the IC card through a mobile telephone network become possible.

As for the prior art related to the present invention of this application, for example, there are technologies disclosed in the following Patent documents 1 and 2.

[Patent document 1] JP 2001-297315 A
[Patent document 2] JP 2003-250183 A

SUMMARY OF THE INVENTION

As described above, in a case where the IC card function is provided in the mobile device, the mobile device can be used in various applications such as a credit card, an ID card, or the like. However, there encountered a problem in that if the mobile device is mislaid or stolen, and the mobile device is unlawfully used, the damage arising therefore is liable to be larger.

In addition, there had been another problem in that if the mobile device becomes not working due to battery exhaustion and the IC card function simultaneously becomes unavailable to use thereby, the mobile device cannot be used, for example, for payments using the credit card function, or for examinations of tickets using the function of the commutation tickets.

The present invention therefore provides a technology for making it possible to control enable/disable of the IC card function provided in the mobile device.

A mobile device having an IC card function of the present invention, includes:

an IC card unit for executing the IC card function;

a function unit for executing a function of at least communication and display;

a control unit for judging whether or not the IC card function can be used in accordance with an operation of the function unit, and outputting the judgment results; and an instruction hold unit for issuing an enable/disable instruction to the IC card unit in response to reception of the judgment results, and holding the enable/disable state even in non-operation state of the control unit.

In the mobile device, an input unit for receiving information from a user may be provided as the function unit, and the control unit may judge whether or not the IC card function can be used in accordance with the input information from the input unit.

The input information from the input unit may be password or biometrics information.

The IC card unit may have a plurality of functions, the control unit may judge for each function whether or not the function can be used, and the instruction hold unit may issue for each function an enable/disable instruction to the IC card unit.

A communication unit for carrying out communication with any of other devices may be provided as the function unit, and the control unit may judge whether or not the IC card function can be used in accordance with a signal received at the communication unit.

The mobile device may include:

a battery unit for supplying an electric power to at least the IC card unit and the function unit; and a power supply monitoring unit for detecting a voltage from the battery unit, and when the voltage detected by the power supply monitoring unit is equal to or smaller than a predetermined value, the instruction hold unit may issue a disable instruction to the IC card unit.

When the voltage detected by the power supply monitoring unit is equal to or smaller than a first threshold, the instruction hold unit may issue an enable instruction to the IC card unit, while halting the function unit, and when the voltage detected by the power supply monitoring unit is equal to or smaller than a second threshold, the instruction hold unit may issue a disable instruction to the IC card unit.

The mobile device may include a storage unit for storing therein enable/disable information issued from the instruction hold unit, when the battery unit is attached/detached, the control unit may read out the enable/disable information before the attachment/detachment from the storage unit, and make the instruction hold unit to issue the same instruction as the enable/disable instruction before the attachment/detachment to the IC card unit.

Further, a mobile device having an IC card function of the present invention, includes:

an IC card unit for executing an IC card function; a communication unit for carrying out communication through a radio telephone line;

a battery unit for supplying an electric power to at least the IC card unit and the communication unit; a power supply monitoring unit for detecting a voltage from the battery unit;

a control unit for judging whether or not the IC card function can be used in accordance with the voltage value detected by the power supply unit, and outputting the judgment results; and an instruction hold unit for issuing an enable/disable instruction to the IC card unit in response to reception of the judgment results, and holding the enable/disable state even in non-operation state of the control unit.

When the voltage detected by the power supply monitoring unit is equal to or smaller than a first threshold, the instruction hold unit may issue an enable instruction to the IC card unit, while halting the communication unit, and when the voltage detected by the power supply monitoring unit is equal to or smaller than a second threshold, the instruction hold unit may issue a disable instruction to the IC card unit.

An IC card function controlling method of the present invention for controlling an IC card function executed by a mobile device including an IC card unit for executing the IC card function, and a function unit for executing at least a communication function and/or a display function, includes the steps of:

judging whether or not the IC card function can be used in accordance with an operation of the function unit; and issuing an enable/disable instruction to the IC card unit in accordance with the judgment results.

When the mobile device includes an input unit for receiving information from a user as the function unit, a judgment whether or not the IC card function can be used, may be carried out in accordance with the input information through the input unit.

The input information may be password or biometrics information.

When the IC card unit has a plurality of functions, in the step of judging whether or not the IC card function can be used, the judgment whether or not the IC card function can be used, may be carried out for each function, and in the step of issuing an enable/disable instruction to the IC card unit, the instruction whether or not the IC card function can be used, may be issued for each function.

When the mobile device includes a communication unit for carrying out communication with any of other devices as the function unit, in the step of judging whether or not the IC card function can be used, the judgment whether or not the IC card function can be used, may be carried out in accordance with a signal received at the communication unit.

When the IC card function controlling method further includes a step of detecting a voltage of a battery unit for supplying an electric power to the IC card unit and the function unit, when the detected voltage is equal to or smaller than a predetermined value, the enable instruction may be issued to the IC card unit.

When the detected voltage is equal to or smaller than a first threshold, the enable instruction may be issued to the IC card unit, while halting the function unit, and when the detected voltage is equal to or smaller than a second threshold, a disable instruction may be issued to the IC card unit.

When the battery unit is attached/detached, the enable/disable information before the attachment/detachment may be read out from a storage unit to issue the same instruction as the enable/disable instruction before the attachment/detachment to the IC card unit.

Further, an IC card function controlling method of the present invention for controlling an IC card function executed by a mobile device including an IC card unit for executing the IC card function, and a communication unit for carrying out communication through a radio telephone line, includes the steps of:

detecting a voltage of a battery unit for supplying an electric power to the IC card unit and the communication unit; judging whether or not the IC card function can be used in accordance with the detected voltage value; and issuing an enable/disable instruction to the IC card unit in accordance with the judgment results.

When the detected voltage is equal to or smaller than a first threshold, an enable instruction may be issued to the IC card unit, while halting the communication unit, and when the detected voltage is equal to or smaller than a second threshold, a disable instruction may be issued to the IC card unit.

Further, the present invention may be a program to execute the above-mentioned steps by a computer. Moreover, the present invention may be a recording medium storing the program that is readable by the computer. Then, by causing the computer to read out the program from the recording medium and to execute the program, it is possible to provide a function of the program.

Here, the computer readable recording medium refers to a recording medium, in which information such as data or a program can be accumulated by an electrical, magnetic, optical, mechanical or chemical action, and the information can be read out by the computer. Examples of the recording media among such recording media, which are capable of being removed from the computer, include a flexible disc, a magneto-optical disc, a CD-ROM, a CD-R/W, a DVD, a DAT, an 8 mm tape, and a memory card.

In addition, a hard disc, a read only memory (ROM) and the like may be given as the recording media to be fixed to the computers.

According to the present invention, it is possible to provide the technology with which enable/disable control of the IC card function provided in the mobile device can be performed.

DESCRIPTION OF THE DRAWINGS

FIG. 6 is a diagram explaining the method including controlling enable/disable of the IC card function under the remote control.

FIG. 7 is a diagram explaining a method including controlling enable/disable of the IC card function under the remote control.

FIGS. 8A and 8B are diagrams explaining a method including controlling enable/disable of the IC card function under the remote control.

DETAILED DESCRIPTION OF THE INVENTION

The best mode for carrying out the invention will hereinafter be described with reference to the drawings. A construction of the following embodiment mode is merely exemplified, and hence the present invention is not limited to the construction of the embodiment mode.

<Overall Construction>

Figure 1:
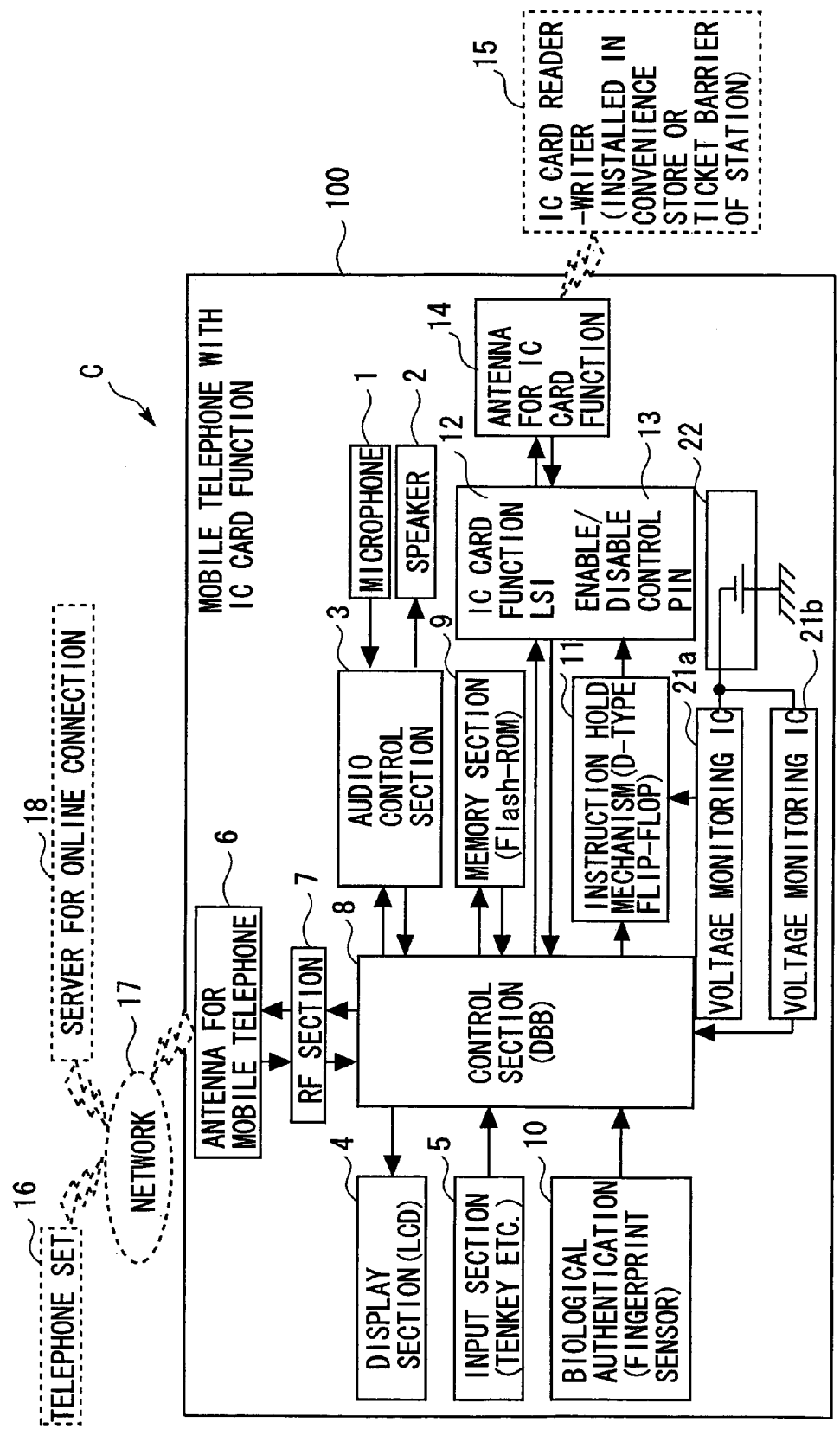
FIG. 1 is a constructional diagram of a mobile device having an IC card function.

FIG. 1 is a schematic constructional diagram of a mobile device according to the present invention. A mobile telephone C with an IC card function of this embodiment mode includes a function unit such as an audio control unit 3, an RF unit (communication unit) 7, a display unit 4, a manipulation unit 5, a biological authentication unit (fingerprint sensor) 10 and the like, a memory unit 9, an instruction hold unit 11, a control unit 8, an IC card unit 12, and voltage monitoring ICs (power supply monitoring units) 21$a$ and 21$b$.

The audio control unit 3 converts a voice inputted through a microphone 1 into an audio signal to input the radio signal to the control unit 8, and also outputs a voice through a speaker 2 based on the audio signal from the control unit 8.

Also, the RF unit 7 transmits a signal from the control unit 8 through an antenna 6 for a mobile telephone in the form of an radio wave, and is connected to another telephone set 16 or a server 18 for online connection through a network (such as a radio telephone line or the Internet line) 17.

The manipulation unit (input unit) 5 has input buttons used to input numerical characters or alphabetical characters, a pointing device for menu selection, and the like.

The display unit (LCD) displays thereon a telephone number, the contents of an e-mail, or the like in accordance with the control made by the control unit 8.

The memory unit (storage unit) 9 is a non-volatile memory (a Flash-ROM in this example), and has a user area in which telephone numbers, e-mail addresses and the like are to be stored, and a system area in which authentication data, a condition table, a user management table, enable/disable information and the like are to be stored.

The biological authentication unit (input unit) 10 reads biometrics information of a user to output the biometrics information to the control unit 8. In this example, the fingerprint sensor is adopted as the biological authentication unit 10. The fingerprint sensor reads fingerprint information of the user who touches a detection surface of the biological authentication unit 10 to output the fingerprint information to the control unit 8. Note that the biometrics information is not limited to the fingerprint information, and hence may also be information of an iris, a voiceprint, or a blood vessel pattern. The control unit 8 compares the biometrics information inputted thereto with information registered in the memory unit 9 in order to carry out the authentication.

When the user manipulates the manipulation unit 5 of those constructional elements 1 to 10 to select a function of a telephone set, for example, the control unit 8 instructs the display unit 4 to display thereon a list of telephone numbers (address book) read out from the memory unit 9 to urge the user to select a telephone number of the other party. When the telephone number of the other party is selected, the control unit 8 controls the RF unit 7 so as to connect the mobile telephone C of the user to a telephone set of the other party in order to carry out the telephonic communication with the other party.

An IC card unit 12 is an LSI for executing the IC card function. The IC card unit 12 is connected to a terminal (reader/writer) 15 for an IC card through an antenna 14 for an IC card function to carry out the communication for the card information with the terminal 15 for an IC card. Thus, the IC card unit 12 executes the IC card function.

Also, the IC card unit 12 has a communication terminal post for communication of information related to the IC card function with the control unit 8. Hence, information can be written from the control unit 8 to the IC card unit 12, and also the control unit 8 can receive notification from the IC card unit 12.

The IC card unit 12 is provided with an enable/disable pin. When a level of an input signal at this pin is High, the IC card function is enabled, while a level of an input signal at this pin is Low, the IC card function is disabled.

Figure 2:
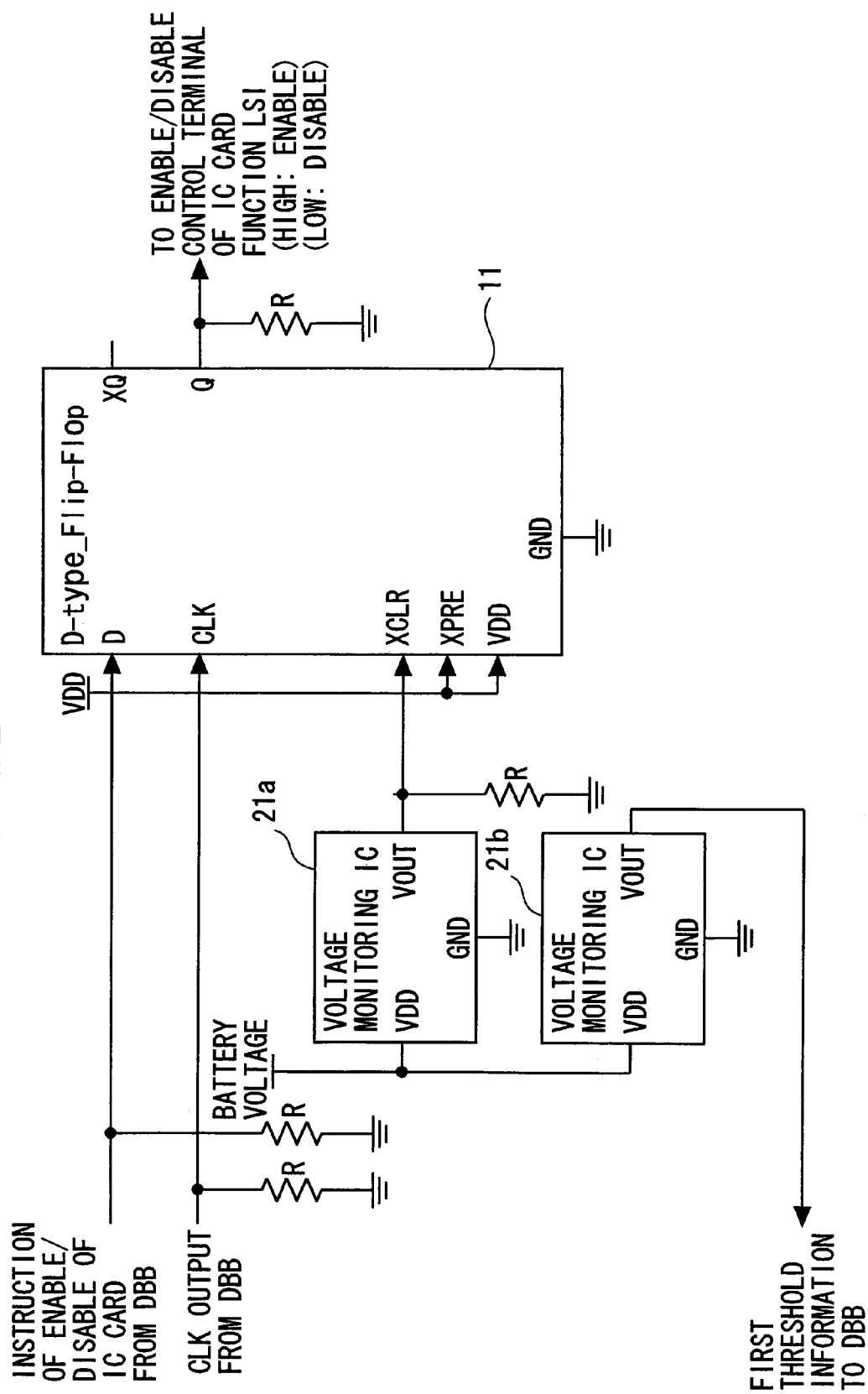
FIG. 2 is a constructional diagram of an instruction hold unit and a voltage monitoring IC.

An instruction hold unit 11 is a flip-flop circuit shown in FIG. 2. The instruction hold circuit 11 issues an enable/disable instruction for the IC card function to the IC card unit 12 by making the level of the output signal at the enable/disable pin of the IC card unit 12 High or Low in accordance with inputs from the control unit 8 and a power supply monitoring unit 21$a$.

A battery unit 22 is a power supply for supplying an electric power to each of the units, and is detachably mounted to a chassis 100 that builds-in those units.

The power supply monitoring unit 21$a$ monitors a remaining power of the battery unit 22, and informs the instruction hold unit 11 of enable/disable of the IC card function in accordance with the remaining power. In this example, a voltage monitoring IC is adopted as the power supply monitoring unit 21$a$. The voltage monitoring unit 21$a$ compares the voltage of the battery unit 22 with a predetermined threshold, and selects a level of a signal to an XCLR input of a flip-flop (instruction hold unit) 11 in accordance with the comparison results to thereby inform the flip-flop (instruction hold unit) 11 of enable/disable of the IC card function.

The power supply monitoring unit 21$b$, as will be described later, monitors a remaining power of the battery unit 22 to inform the control unit 8 of stop of supply of the electric power to the function units and the like in accordance with the remaining power.

Note that although the mobile device of this embodiment is constructed with each of the units in the form of the special purpose hardware, the mobile device of the present invention may adopt such a construction that a general purpose computer including a CPU, a memory, and the like realizes the functions of the units 1 to 11 in accordance with software (a control program of the IC card function).

<Control of Enable/Disable Based on Direct Input>

Figure 3A:
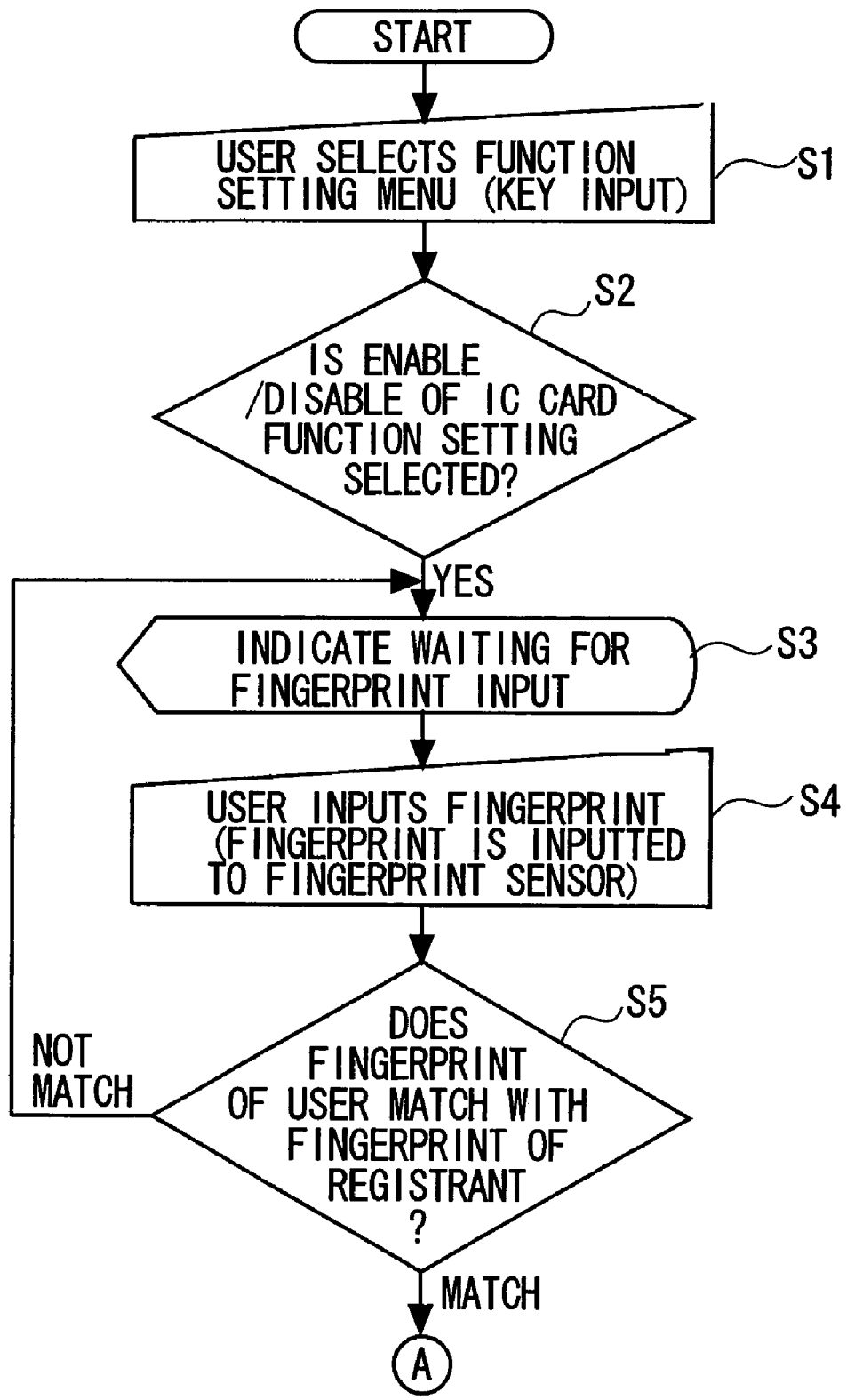
FIGS. 3A and 3B are diagrams explaining a method including controlling enable/disable of the IC card function based on a key manipulation.
Figure 3B:
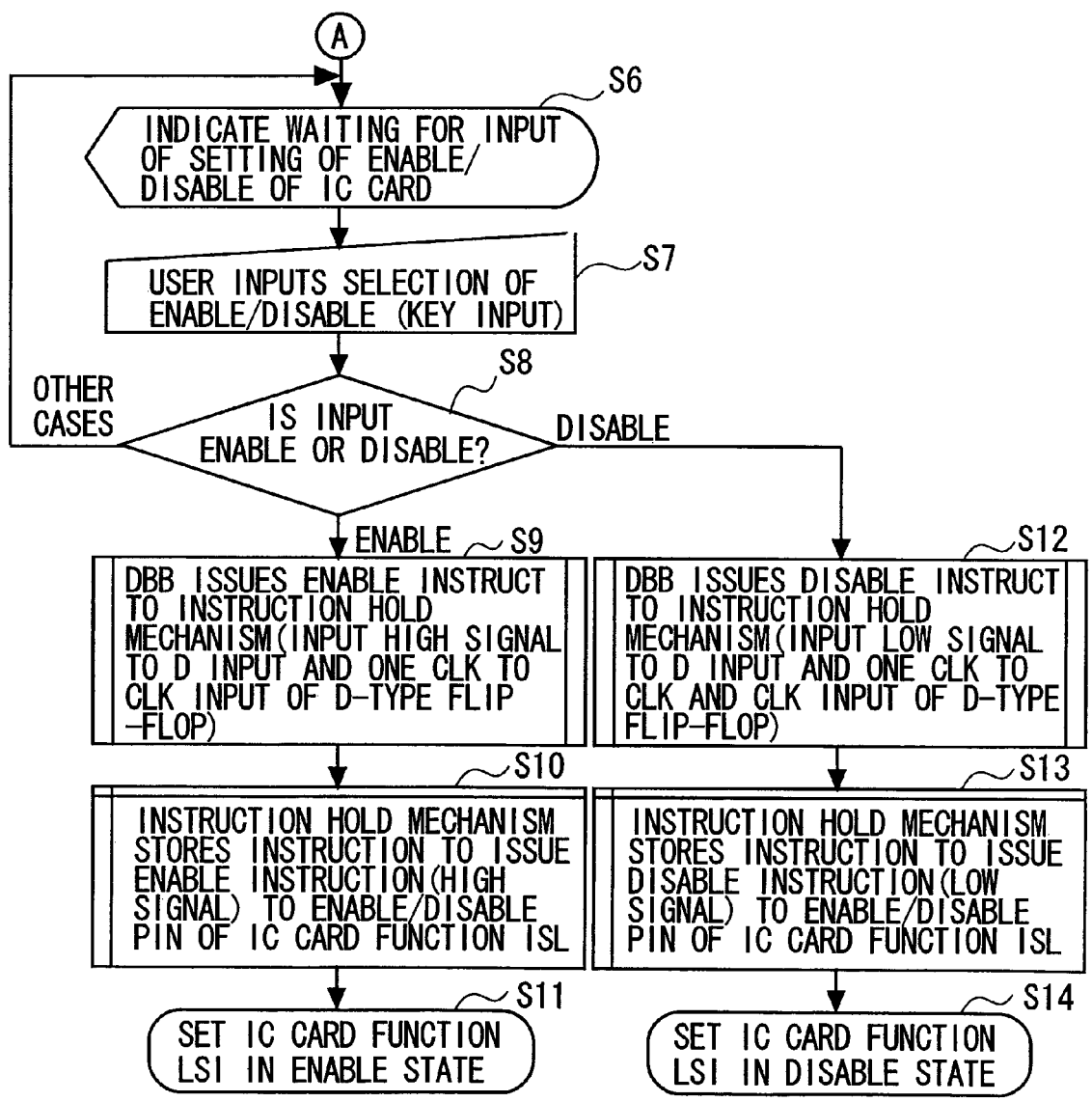
Figure 4:
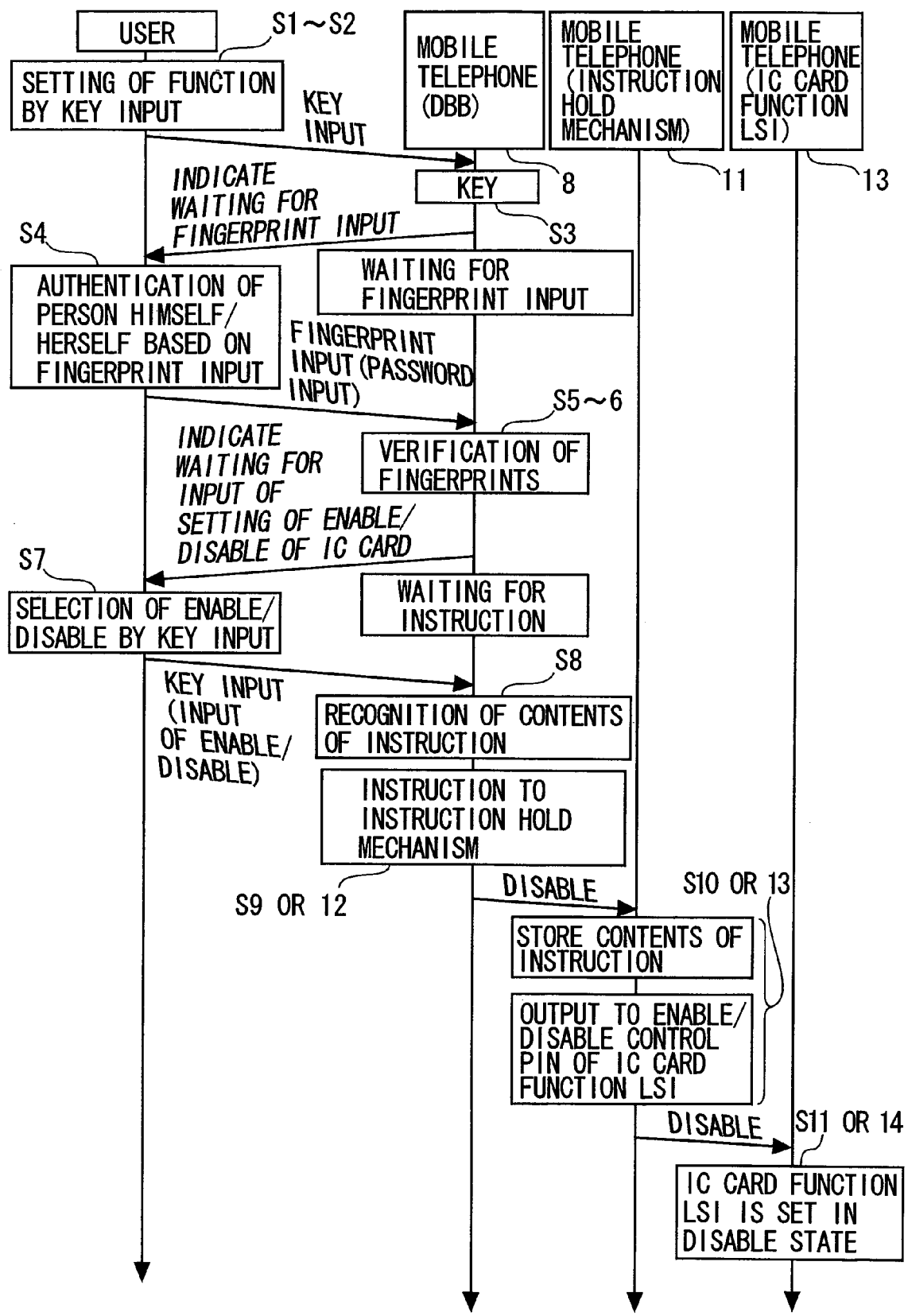
FIG. 4 is a diagram explaining the method including controlling enable/disable of the IC card function based on the key manipulation.

FIGS. 3 and 4 are flow charts each explaining a method including controlling enable/disable of the IC card function based on a key manipulation.

First of all, a user selects a function setting menu by manipulating the manipulation unit 5 (Step 1: a Step number will hereinafter be abbreviated as Sn such as S1). If enable/disable of the IC card function is set (S2), an indication of waiting for a fingerprint input is displayed (S3).

When the user inputs his/her fingerprint information through the biological authentication unit 10 (S4), the control unit 8 judges whether or not the fingerprint information inputted thereto matches with fingerprint information of a registrant by referring to the memory unit 9 (S5).

When the judgment results show that the fingerprint information does not match with the information registered, the operation is returned back to Step 3 to wait for an input. When the judgment results show the matching, an indication of waiting for an input of setting of enable/disable of the IC function is displayed (S6).

When the user inputs selection of enable/disable (S7), and this input corresponds to enable, the control unit 8 issues an enable instruction to the instruction hold unit 11. That is, a signal at a High level, and one CLK are inputted to a D input and a CLK input of the flip-flop (instruction hold unit) 11, respectively (S8 and S9). As a result, the instruction hold unit 11 issues an enable instruction (a signal at a High level is inputted) to the enable/disable pin of the IC card unit 12 to hold the enable instruction (S10) to thereby set the IC card unit 12 in an enable state (S11).

On the other hand, when a disable instruction is issued in Step 7, the control unit 8 issues a disable instruction to the instruction hold unit 11. That is, a signal at a Low level and one CLK are outputted to the D input and the CLK input of the flip-flop (instruction hold unit) 11 shown in FIG. 2, respectively (S8 and S12). As a result, the instruction hold unit 11 issues a disable instruction (a signal at a Low level is inputted)

to the enable/disable pin of the IC card unit 12 to hold the disable instruction (S13) to thereby set the IC card unit 12 in a disable state (S14).

<Control of Enable/Disable Under Remote Control>

Figure 5:
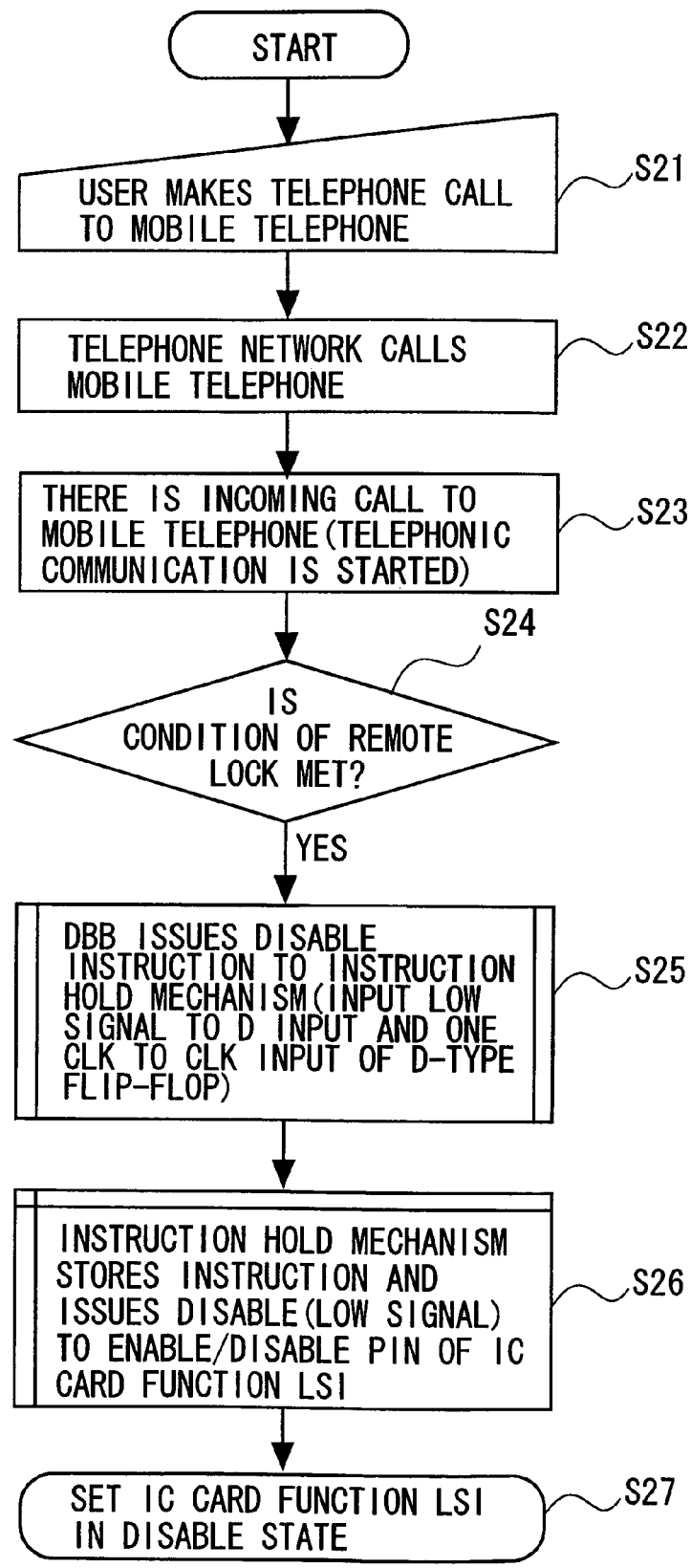
FIG. 5 is a diagram explaining a method including controlling enable/disable of the IC card function under remote control.

Further, FIGS. 5 to 7 are flow charts each explaining a method for controlling enable/disable of the IC card function under remote control.

A user makes a telephone call to the mobile telephone C of this example (S21), and a telephone exchange constructing the network 17 executes a processing for calling to the mobile telephone C (S22) to execute an incoming call processing for the mobile telephone C to start a telephonic communication (S23). The control unit 8 of the mobile telephone C, in correspondence to this telephonic communication (i.e., an operation of the communication unit), judges whether or not the condition of remote lock is met (S24).

When it is judged that the condition of the remote lock is met, the control unit 8 issues a disable instruction to the instruction hold unit 11 (S25). Then, the instruction hold unit 11 issues a disable instruction (a signal at a Low level is inputted) to the enable/disable pin of the IC card unit 12 to hold the disable instruction (S26) to set the IC card unit 12 in a disable state (S27).

At this time, in Step 24, the control unit 8 carries out the judgment under the condition previously stored in the memory unit 9, i.e., in this example, the condition that an incoming call of a predetermined telephone number (monitoring number) is received equal to or larger than predetermined times within a predetermined time period. When this condition is met, the control unit 8 judges that the remote lock is permitted (the setting of disable is made by the communication) to issue a disable instruction to the instruction hold unit 11. FIG. 7 is A diagram explaining this judgment processing.

When there is an incoming call (S31), the control unit 8 judges whether or not the remote lock is being set by referring to the memory unit 9 (S32). When the remote lock is inhibited, the control unit 8 ends the processing. When the remote lock is permitted (in being set), the control unit 8 judges whether or not the remote lock is being monitored (whether or not the number of times of an incoming call is incremented) (S33).

When it is judged in Step 33 that the remote lock is not being monitored, the control unit 8 judges whether or not an originating number is the monitoring number (S41). When it is judged that the originating number is the monitoring number, and hence the IC card unit is not already disabled (in being locked), the monitoring is started (S42 and S43). Otherwise, the processing is stopped.

On the other hand, when it is judged in S33 that the remote lock is being monitored, the control unit 8 judges whether or not the originating number is the monitoring number (S34). When it is judged in S34 that the originating number is the monitoring number, the number of times of an incoming call is incremented (S35)

The control unit 8 judges whether or not the current number of times of an incoming call is equal to or larger than the predetermined number of times. When it is judged that the current number of times of an incoming call is smaller than the predetermined number of times, the monitoring is continued. When it is judged that the current number of times of an incoming call is equal to or larger than the predetermined number of times, the monitoring is stopped (S36). Next, the control unit 8 judges whether or not the IC card unit 12 is already in being locked. When it is judged that the IC card unit 12 is not yet in being locked, the control unit 8 reports an automatic answer message that "the IC card function is halted", and informs the instruction hold unit 11 of disable of the IC card function.

Figure 8B:
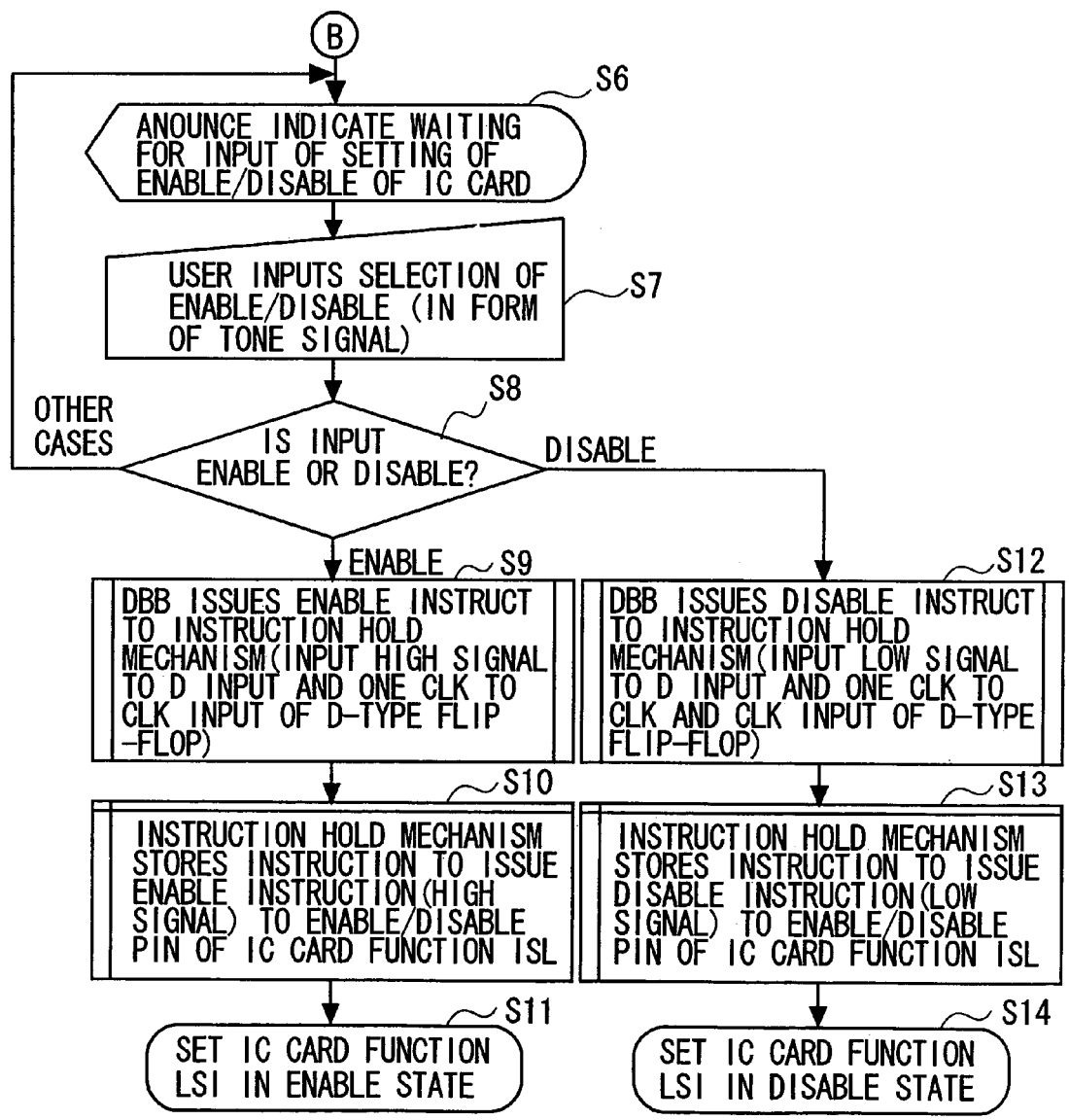
Figure 9A:
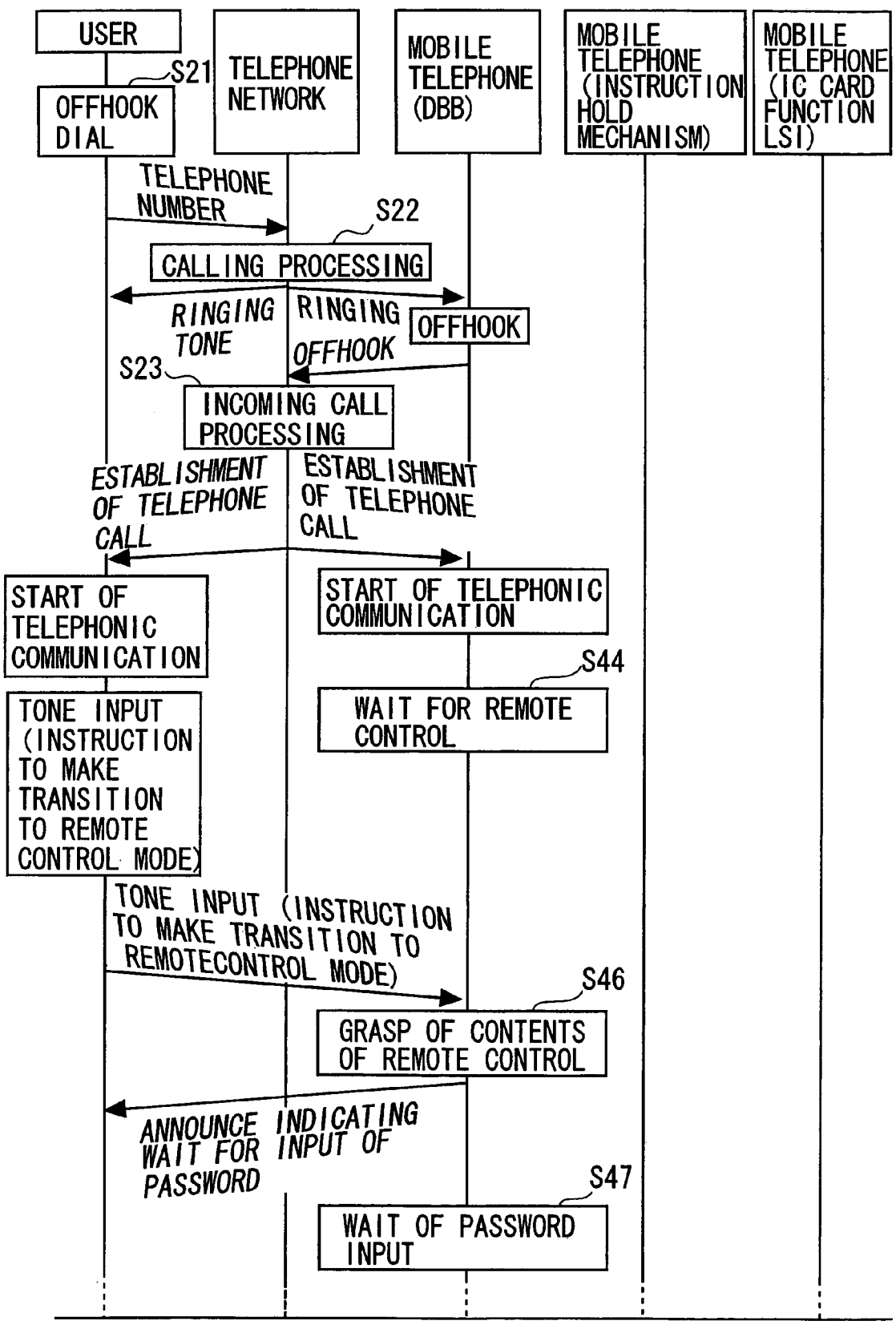
FIGS. 9A and 9B are diagrams explaining the method including controlling enable/disable of the IC card function under the remote control.
Figure 9B:
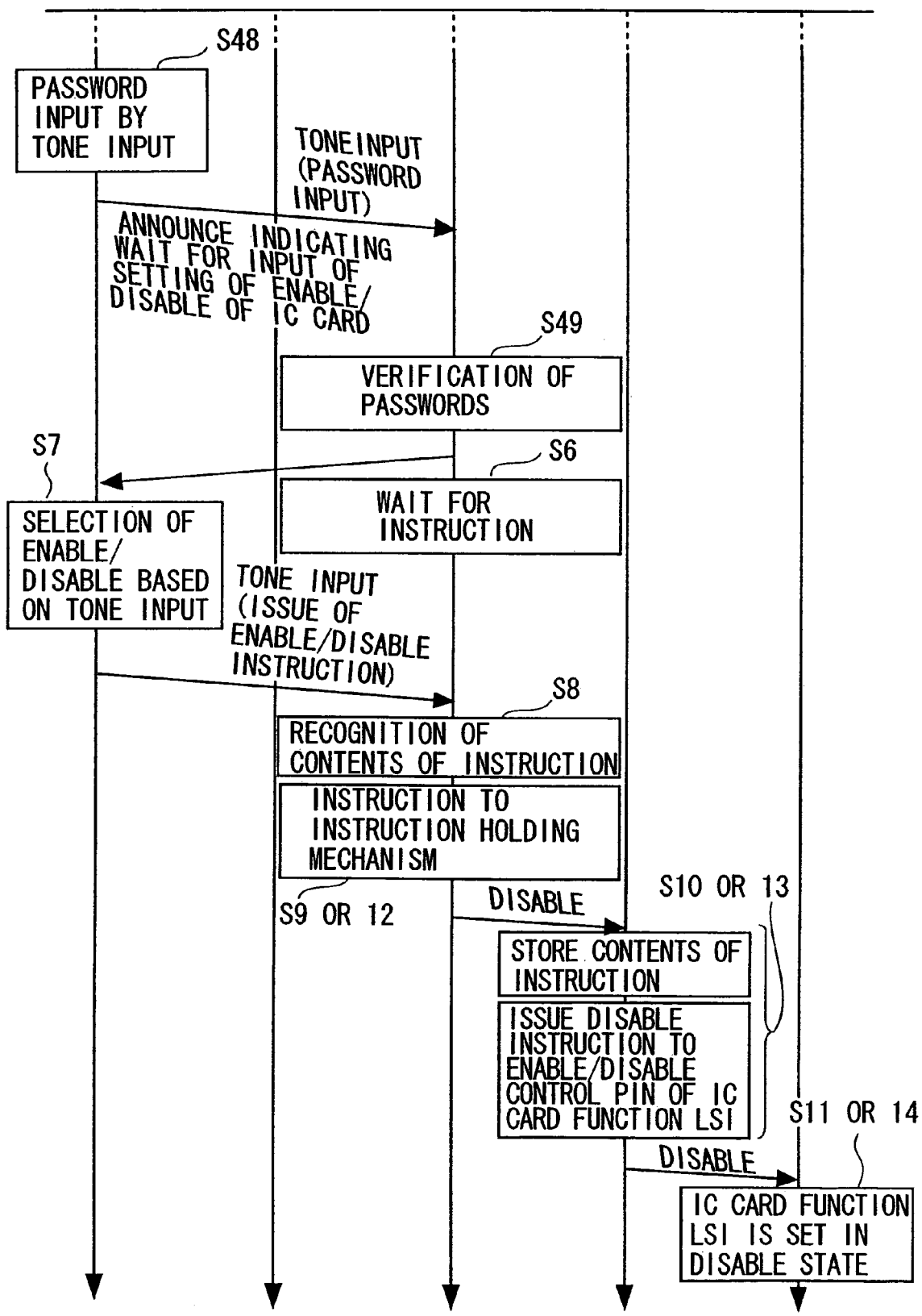

Besides, FIGS. 8 and 9 are flow charts each explaining a method of controlling enable/disable by inputting password through a tone input operation.

A user makes a telephone call to the mobile telephone C of this example (S21), and the network 17 executes a processing for calling to the mobile telephone C (S22) to execute an incoming call processing for the mobile telephone C to start a telephonic communication (S23).

The control unit 8 of the mobile telephone C, in response to this telephonic communication (i.e., the operation of the communication unit), starts to judge whether or not the condition of the remote lock is met. Thus, firstly, the mobile telephone C waits for an instruction under the remote control (S44).

When the user pushes the numeral keys in the order of "0123" for example showing start of the remote control, a corresponding tone signal is inputted to the mobile telephone C (S45). If this tone signal is a signal for setting of enable/disable of the IC card function (S46), then the mobile telephone C transmits an announcement that the mobile phone C waits for an input of password (S47).

When the user inputs the password in the form of a tone signal (S48), the control unit 8 judges whether or not the input password matches with the previously registered password by referring to the memory unit 9. When it is judged that the input password matches with the previously registered password, the mobile telephone C makes an announcement that the mobile telephone C waits for an input of setting of enable/disable of the IC card (S6).

Hereinafter, similarly to the operation of FIG. 3, the user inputs a tone signal for selection of enable/disable (S7) When this input corresponds to enable, the control unit 8 issues an enable instruction to the instruction hold unit 11 (S8 and S9). As a result, the instruction hold unit 11 issues an enable instruction (a signal at a High level is inputted) to the enable/disable pin of the IC card unit 12 to hold the enable instruction (S10) to set the IC card unit 12 in an enable state (S11).

On the other hand, when the input corresponds to disable, the control unit 8 issues a disable instruction to the instruction hold unit 11 (S8 and S12). As a result, the instruction hold unit 11 issues a disable instruction (a signal at a Low level is inputted) to the enable/disable pin of the IC card unit 12 to hold the disable instruction (S13) to set the IC card unit 12 in a disable state (S14).

As described above, the IC card function can be halted from a distant place through the network 17. Thus, since even when the mobile telephone C is mislaid, or even when the mobile telephone C is stolen, the mobile telephone C can be set in a disable state, it is possible to prevent the mobile telephone C from being unlawfully used.

Note that although this example shows a construction that an enable/disable instruction is issued to a single enable/disable pin, the present invention is not limited to this construction, and hence the following constructions may also be adopted.

(1) When the IC card unit 12 has a plurality of functions, an enable/disable pin is provided for each function. Then, a user selects enable/disable for each function. In response to this selection, the control unit 8 carries out a judgment of enable/disable with respect to only the selected function to instruct the instruction hold unit 11 to issue an enable/disable instruction. As a result, for example, it is possible to carry out such selective control that the function of a commutation ticket is made enable while a function of a prepaid card being made disable, and so forth.

(2) Moreover, in case of the construction (1), which of a plurality of functions is made enable and which of a plurality of functions is made disable may be set for each user. For example, when the mobile telephone C is adapted to be used by the plurality of users, the enable functions and the disable functions are stored in association with each of the users in a user management table of the memory unit 9. Then, in activating the mobile telephone C, the control unit 8 requires a user to input his/her biometrics information, and specifies a user of the biometrics information by referring to the memory unit 9. Thus, the control portion 8 reads out the enable functions and the disable functions to the user, and output this read-out results to instruction hold unit 11.

(3) The control unit 8 previously stores enable/disable (judgment results) of the IC card functions. Whenever the IC card unit 12 starts execution of the IC card function, the IC card unit 12 informs the control unit 8 of the function intended to be used through the communication terminal post. Then, the control unit 8 issues instruction regarding an enable/disable of the IC card functions to the IC card unit 12 through the communication terminal post. The IC card unit 12, in response to the instruction issued thereto, executes the function when the instruction is an enable instruction, and halts the function when the instruction is a disable instruction.

(4) The IC card unit 12 is provided with the user management table to which the control unit 8 previously writes the enable/disable information for each function and information on current users. When executing the IC card function, the IC card unit 12 refers to its user management table to determine enable or disable of its IC card function.

(5) Whenever the IC card unit 12 starts execution of the IC card function, the IC card unit 12 informs the control unit 8 of the function intended to be used. In response to this information, the control unit 8 issues an instruction regarding enable/disable of the function concerned to one enable/disable terminal through the instruction hold unit 11. As a result, even when the IC card unit 12 has a plurality of functions, the control for enable/disable can be carried out with one terminal.

(6) The control unit 8 may monitor the operation of the IC card unit 12 to carry out a judgment about enable/disable in accordance with the operation of the IC card unit 12. For example, when after the control unit 8 judges that the function of the prepaid card is enabled, the control unit 8 detects that the payment operation is completed based on the prepaid card function, the control unit 8 carries out the disable setting again.

Note that although the example in which a telephone call is made to the mobile telephone C is shown for the remote control, the present invention is not limited to this example, and hence any construction may be adopted as long as the construction allows the mobile device to receive information exhibiting enable/disable of the IC card function such as transmission of only an e-mail, a chat or a control signal.

<Control for Enable/Disable Based on Monitoring of Power Supply>

Figure 10:
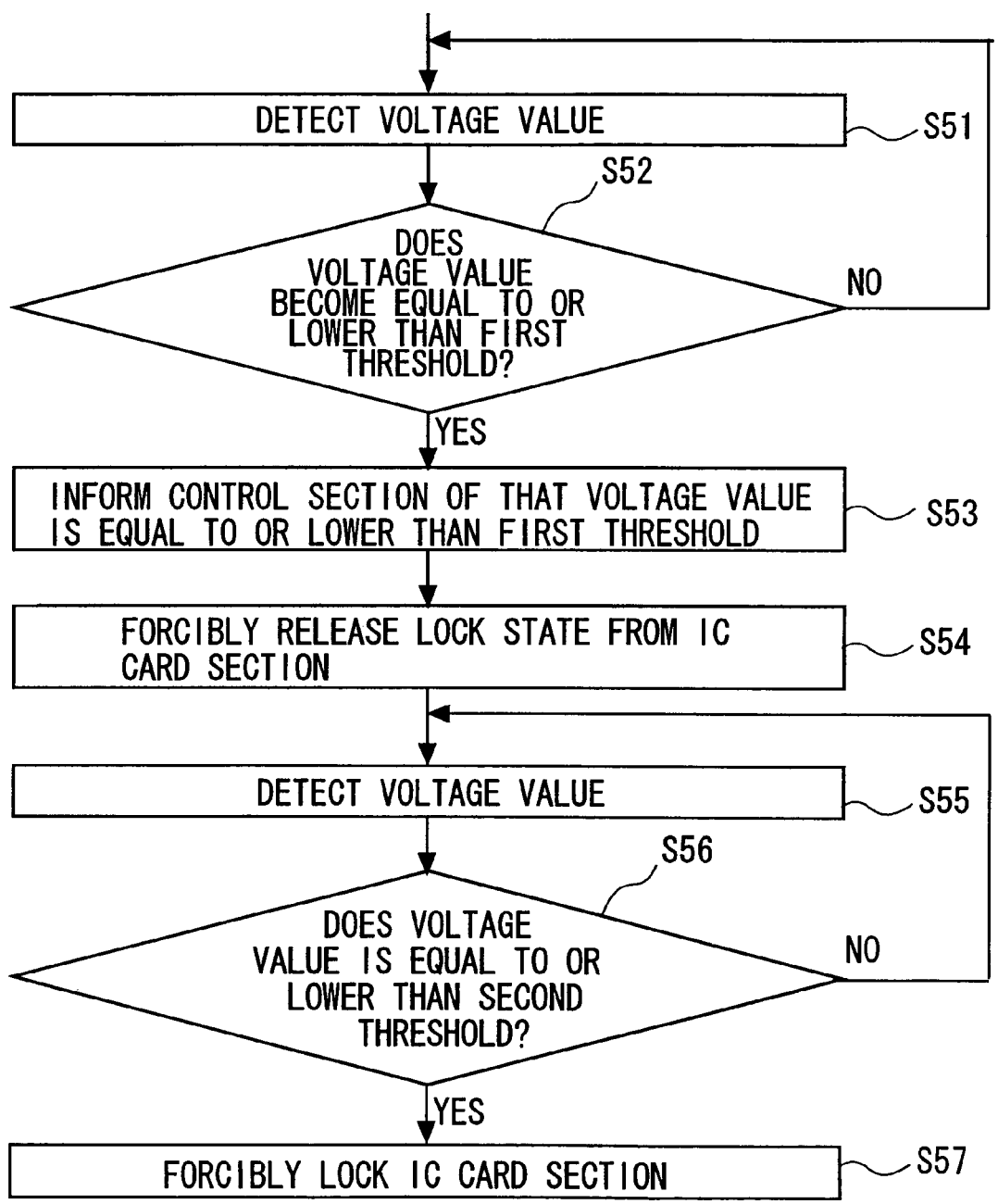
FIG. 10 is a diagram explaining a method including controlling enable/disable of the IC card function in accordance with the results of monitoring of a power supply.

FIG. 10 is A diagram explaining a method including controlling enable/disable of the IC card function in accordance with the results of monitoring of the power supply.

The voltage monitoring IC 21b monitors a voltage value of the battery unit 22 at all times (S51) to judge whether or not the voltage value is equal to or lower than a first threshold (S52). When it is judged that the voltage value is equal to or lower than the first threshold, the voltage monitoring IC 21b sends a signal representing that the voltage value is equal to or lower than the first threshold to the control unit 8 through an output terminal VOUT (S53). In response to this notification sent thereto, even when the current instruction corresponds to a lock state (disable), the control unit 8 instructs the instruction hold unit 11 to forcibly release the lock state of the IC card unit 12 to provide an enable state. Also, the control unit 8 stops the supply of the electric power to each of the function units such as the communication unit (in this example, the portions other than the IC card unit 12, the instruction hold unit 11, and the voltage monitoring ICs 21), i.e., turns OFF the power supply of the mobile telephone C (S54).

After the power supply of the mobile telephone C is turned OFF, the voltage monitoring IC 21a continuously monitors the voltage value of the battery unit 22 (S55) to judge whether or not the voltage value is equal to or smaller than a second threshold (S56). When it is judged that the voltage value is equal to or smaller than the second threshold, a level of a signal outputted through the output terminal VOUT is made Low. Then, even when the control unit 8 issues an enable instruction to the instruction hold unit 11, the voltage monitoring IC 21a instructs the instruction hold unit 11 to forcibly lock the IC card unit 12 to provide a disable state for the IC card unit 12 (S57).

Note that the first threshold is set higher than the second threshold, and in this embodiment mode, the second threshold is set as a use limit (e.g., 2.7 V) of the IC card unit and the first threshold is set as a higher voltage value (e.g., 3.2 V) with which an electric power that is sufficient for the IC card unit 12 to be used for predetermined times can be ensured, which is higher than the second threshold.

As a result, even when the battery voltage decreases due to use of the mobile device to turn OFF the power supply of the mobile device, it is possible to ensure the use of the IC card function. For example, even if the battery of the mobile telephone is exhausted when a user does telephonic communication with the other party in a platform of a station, the user can pass through a ticket barrier of a station by using the IC card function.

Figure 11:
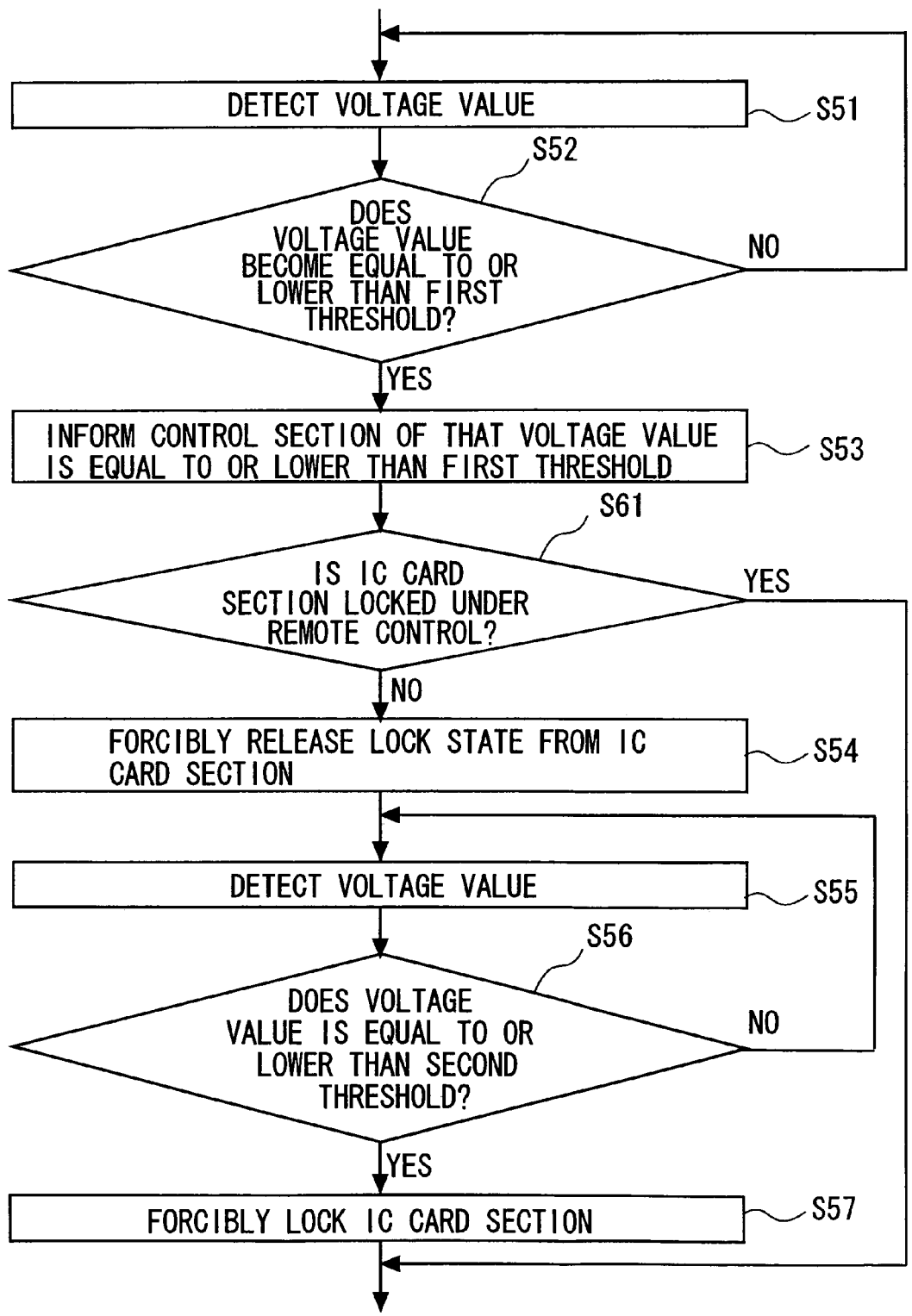
FIG. 11 is a diagram explaining a method including controlling enable/disable of the IC card function in accordance with the results of monitoring of the power supply.

Note that although in the example of FIG. 10, the lock of the IC card unit 12 is unconditionally released when the battery voltage is equal or lower than the first threshold, in a case where the IC card unit 12 is locked under the remote control, as shown in FIG. 11, the mobile telephone may also be constructed so as not release the lock of the IC card unit 12 since the mobile telephone may possibly be mislaid or stolen.

Thus, when the control unit 8 is informed in Step 53 of the effect that the battery voltage is equal to or lower than the first threshold, the control unit 8 judges whether or not the IC card unit 12 is locked under the remote control (S61). When it is judged that the IC card unit 12 is locked under the remote control, the lock state is kept as it is. When it is judged that the IC card unit 12 is not locked under the remote control, similarly to the foregoing, the processing is executed (S54 to S57).

In addition, in this embodiment, when the battery voltage is extremely low, or when the battery is dislodged from the mobile telephone C, in order to prevent the instruction hold unit 11 and the IC card unit 12 from operating uncertainly, a grounded resistor R for pull-down is provided in an input line or an output line of the instruction hold unit 11 so as to surely provide the disable state for the mobile telephone C. Thus, the malfunction due to the reduction of the battery voltage is prevented.

Thus, even if the enable state is set for the mobile telephone C, attachment/detachment of the battery unit 22 for exchange etc of the battery surely results in the disable state. Therefore, a user must set the enable state again on such occasions. Thus, when carrying out the control for enable/disable, the control unit 8 may store the enable/disable information in the memory unit 9, may detect that the battery unit 2 is attached, may read out the enable/disable information right before the attachment of the battery unit 2 by referring to the memory unit 9, and may send enable/disable information to the instruction hold unit 11 based on the information thus read out. As a result, even when the battery unit 22 is attached/detached, the setting right before the attachment/detachment of the battery unit 22 is restored, so as to omit a work for resetting.

Note that although it is supposed in this embodiment that the function units are the communication unit 7, the display unit 4, the biological authentication unit 10 and the like, the present invention is not limited thereto. That is, any portion may become the function unit as long as this portion executes a predetermined function giving an opportunity for controlling enable/disable of the IC card function. For example, in case of a device adapted to carry out the remote lock, the device has to include at least a communication unit for receiving information of the remote control. In case of a device adapted to lock the IC card unit in accordance with a power supply voltage, the device has to include at least a unit adapted to share a power supply with the IC card unit for operation.

<Other Embodiment Modes>

It is to be understood that the present invention is not intended to be limited to only the illustrated examples and hence various changes may be made without departing the subject matter of the present invention.

INDUSTRIAL APPLICABILITY

The present invention can be widely applied to mobile type electronic devices such as a mobile telephone, a PDA, a note type personal computer, a watch, an on-vehicle computer, an ETC terminal, and a game machine in each of which the IC card unit can be provided.

What is claimed is:

1. A mobile device, comprising:
   an IC card unit executing an IC card function;
   a function unit executing a function of at least one of communication and display and outputting a signal indicative of an operation of the function unit;
   a control unit when electric power is supplied thereto, receiving the signal output from the function unit and judging whether or not the IC card function can be used based on the signal received from the function unit, and outputting judgment results; and
   an instruction hold unit storing an enable state in response to the judgment results indicating that the IC card function can be used or storing a disable state in response to the judgment results indicating that the IC card cannot be used, and issuing an enable instruction or a disable instruction to the IC card unit according to the stored state, even in non-operation state of the control unit when electric power is not supplied to the control unit.

2. The mobile device according to claim 1, wherein an input unit receiving information from a user is provided as the function unit, and
   the control unit judges whether or not the IC card function can be used in accordance with the input information from the input unit.

3. The mobile device according to claim 2, wherein the input information from the input unit is password or biometrics information.

4. The mobile device according to claim 1, wherein the IC card unit has a plurality of functions,
   the control unit judges for each function whether or not the function can be used, and
   the instruction hold unit issues for each function an enable instruction or a disable instruction to the IC card unit.

5. The mobile device according to claim 1, wherein a communication unit carrying out communication with any of other devices is provided as the function unit, and
   the control unit judges whether or not the IC card function can be used in accordance with a signal received at the communication unit.

6. The mobile device according to claims 1, further comprising:
   a battery unit supplying an electric power to at least the IC card unit and the function unit; and
   a power supply monitoring unit detecting a voltage from the battery unit,
   wherein when the voltage detected by the power supply monitoring unit is equal to or smaller than a predetermined value, the instruction hold unit issues a disable instruction to the IC card unit.

7. The mobile device according to claim 6, wherein when the voltage detected by the power supply monitoring unit is equal to or smaller than a first threshold, the instruction hold unit issues an enable instruction to the IC card unit, while halting the function unit, and when the voltage detected by the power supply monitoring unit is equal to or smaller than a second threshold, the instruction hold unit issues a disable instruction to the IC card unit.

8. The mobile device according to claim 6, further comprising a storage unit storing therein enable/disable information issued from the instruction hold unit,
   when the battery unit is attached/detached, the control unit reads out the enable/disable information before the attachment/detachment from the storage unit, and make the instruction hold unit to issue the same instruction as the enable instruction or the disable instruction before the attachment/detachment to the IC card unit.

9. A mobile device, comprising:
   an IC card unit executing an IC card function;
   a communication unit carrying out communication through a radio telephone line;
   a battery unit supplying an electric power to at least the IC card unit and the communication unit;
   a power supply monitoring unit detecting a voltage from the battery unit;
   a control unit when electric power is supplied thereto, judging whether or not the IC card function can be used in accordance with the voltage value detected by the power supply monitoring unit, and outputting the judgment results; and
   an instruction hold unit issuing an enable instruction or a disable instruction to the IC card unit in response to reception of the judgment results, and holding the enable/disable state even in non-operation state of the control unit when electric power is not supplied to the control unit.

10. The mobile device according to claim 9, wherein when the voltage detected by the power supply monitoring unit is equal to or smaller than a first threshold, the instruction hold unit issues an enable instruction to the IC card unit, while halting the communication unit, and
   when the voltage detected by the power supply monitoring unit is equal to or smaller than a second threshold, the instruction hold unit issues a disable instruction to the IC card unit.

11. An IC card function controlling method for controlling an IC card function executed by a mobile device including an IC card unit executing the IC card function, a control unit and a function unit executing at least one of a communication function and a display function, comprising the steps of:
outputting from the function unit a signal indicative of operation of the function unit;
judging whether or not the IC card function can be used based on the signal indicative of the operation of the function unit, and outputting a judgment result when electric power is supplied to the control unit; and
storing an enable state in response to the judgment result indicating that the IC card function can be used;
storing a disable state in response to the judgment result indicating that the IC card function cannot be used;
issuing an enable instruction or a disable instruction to the IC card unit in accordance with the stored state when electric power is not supplied to the control unit; and
holding the enable state until a new judgment result is output.

12. The IC card function controlling method according to claim 11, wherein when the mobile device includes an input unit receiving information from a user as the function unit,
in accordance with the input information through the input unit, a judgment related to whether or not the IC card function can be used is carried out.

13. The IC card function controlling method according to claim 12, wherein the input information is password or biometrics information.

14. The IC card function controlling method according to claim 11, wherein when the IC card unit has a plurality of functions,
in the step of judging whether or not the IC card function can be used, the judgment whether or not the IC card function can be used is carried out for each function, and
in the step of issuing an enable instruction or a disable instruction to the IC card unit, the instruction whether or not the IC card function can be used is issued for each function.

15. The IC card function controlling method according to claim 11, wherein when the mobile device includes a communication unit carrying out communication with any of other devices as the function unit,
in the step of judging whether or not the IC card function can be used, the judgment related to whether or not the IC card function can be used is carried out in accordance with a signal received at the communication unit.

16. The IC card function controlling method according to any one of claims 11 to 15, wherein when the IC card function controlling method further comprises a step of detecting a voltage of a battery unit supplying an electric power to the IC card unit and the function unit,
when the detected voltage is equal to or smaller than a predetermined value, the enable instruction is issued to the IC card unit.

17. The IC card function controlling method according to claim 16, wherein when the detected voltage is equal to or smaller than a first threshold, the enable instruction is issued to the IC card unit while halting the function unit, and when the detected voltage is equal to or smaller than a second threshold, a disable instruction is issued to the IC card unit.

18. The IC card function controlling method according to claim 16, wherein when the battery unit is attached/detached, the enable/disable information before the attachment/detachment is read out from a storage unit to issue the same instruction as the enable instruction or the disable instruction before the attachment/detachment to the IC card unit.

19. An IC card function controlling method for controlling an IC card function executed by a mobile device including an IC card unit executing the IC card function, a control unit and a communication unit carrying out communication through a radio telephone line, comprising the steps of:
detecting a voltage of a battery unit supplying an electric power to the IC card unit and the communication unit;
judging whether or not the IC card function can be used in accordance with the detected voltage value when electric power is supplied to the control unit; and
issuing an enable instruction or a disable instruction to the IC card unit in accordance with the judgment results when electric power is not supplied to the control unit.

20. The IC card function controlling method according to claim 19, wherein when the detected voltage is equal to or smaller than a first threshold, an enable instruction is issued to the IC card unit, while halting the communication unit, and when the detected voltage is equal to or smaller than a second threshold, a disable instruction is issued to the IC card unit.

21. A storage medium which stores an IC card function controlling program for controlling an IC card function executed by a mobile device including an IC card unit executing the IC card function, a control unit and a function unit executing at least one of a communication function and a display function, the program executing a method comprising the steps of:
outputting from the function unit a signal indicative of an operation of the function unit:
judging whether or not the IC card function can be used based on the signal indicative of the operation of the function unit, and outputting a judgment result when electric power is supplied to the control unit;
storing an enable state in response to the judgment result indicating that the IC card function can be used;
storing a disable state in response to the judgment result indicating that the IC card function cannot be used;
issuing an enable instruction or a disable instruction to the IC card unit in accordance with the stored state when electric power is not supplied the control unit; and
holding the enable state until a new judgment result is output.

22. A storage medium which stores an IC card function controlling program according to claim 21, wherein when the mobile device includes an input unit receiving information from a user as the function unit, and the program executing the method further comprising:
a judgment whether or not the IC card function can be used is carried out in accordance with the input information through the input unit.

23. A storage medium which stores an IC card function controlling program according to claim 22, wherein the input information is password or biometrics information.

24. A storage medium which stores an IC card function controlling program according to claim 21, wherein when the IC card unit has a plurality of functions,
in the step of judging whether or not the IC card function can be used, the instruction whether or not the IC card function can be used is carried out for each function, and
in the step of issuing the enable instruction or the disable instruction to the IC card unit, the judgment whether or not the IC card function can be used is issued for each function.

25. A storage medium which stores an IC card function controlling program according to claim 21, wherein when the mobile device includes a communication unit carrying out communication with any of other devices as the function unit,
in the step of judging whether or not the IC card function can be used, the judgment related to whether or not the IC card function can be used is carried out in accordance with a signal received at the communication unit.

26. A storage medium which stores an IC card function controlling program according to claim 21, wherein when the IC card function controlling method further includes a step of detecting a voltage of a battery unit supplying an electric power to the IC card unit and the function unit,
when the detected voltage is equal to or smaller than a predetermined value, the enable instruction is issued to the IC card unit.

27. A storage medium which stores an IC card function controlling program according to claim 26, wherein when the detected voltage is equal to or smaller than a first threshold, the enable instruction is issued to the IC card unit while halting the function unit, and when the detected voltage is equal to or smaller than a second threshold, a disable instruction is issued to the IC card unit.

28. A storage medium which stores an IC card function controlling program according to claim 26, wherein when the battery unit is attached/detached, the enable/disable information before the attachment/detachment is read out from a storage unit to issue the same instruction as the enable instruction or the disable instruction before the attachment/detachment to the IC card unit.

29. A storage medium which stores an IC card function controlling program for controlling an IC card function executed by a mobile device including an IC card unit executing the IC card function, a control unit and a communication unit carrying out communication through a radio telephone line, the program executing a method comprising the steps of:
detecting a voltage of a battery unit supplying an electric power to the IC card unit and the communication unit;
judging whether or not the IC card function can be used in accordance with the detected voltage value when electric power is supplied to the control unit; and
issuing an enable instruction or a disable instruction to the IC card unit in accordance with the judgment results when electric power is not supplied to the control unit.

30. A storage medium which stores an IC card function controlling program according to claim 29, wherein when the detected voltage is equal to or smaller than a first threshold, an enable instruction is issued to the IC card unit, while halting the communication unit, and when the detected voltage is equal to or smaller than a second threshold, a disable instruction is issued to the IC card unit.

31. A mobile device, comprising:
an IC card unit executing an IC card function;
a function unit executing a function of at least one of communication and display;
a control unit when electric power is supplied thereto, judging whether or not the IC card function can be used in accordance with an operation of the function unit, and outputting judgment results;
an instruction hold unit storing an enable state in response to the judgment results indicating that the IC card function can be used or storing a disable state in response to the judgment results indicating that the IC card cannot be used, and issuing an enable instruction or a disable instruction to the IC card unit according to the stored state, even in non-operation state of the control unit when electric power is not supplied to the control unit;
a battery unit supplying an electric power to at least the IC card unit and the function unit; and
a power supply monitoring unit detecting a voltage from the battery unit,
wherein when the voltage detected by the power supply monitoring unit is equal to or smaller than a predetermined value, the instruction hold unit issues a disable instruction to the IC card unit.

32. An IC card function controlling method for controlling an IC card function executed by a mobile device including an IC card unit executing the IC card function, a control unit and a function unit executing at least one of a communication function and a display function, comprising the steps of:
judging whether or not the IC card function can be used in accordance with an operation of the function unit, and outputting a judgment result when electric power is supplied to the control unit; and
storing an enable state in response to the judgment result indicating that the IC card function can be used;
storing a disable state in response to the judgment result indicating that the IC card function cannot be used;
issuing an enable instruction or a disable instruction to the IC card unit in accordance with the stored state when electric power is not supplied to the control unit;
holding the enable state until a new judgment result is output; and
detecting a voltage of a battery unit supplying an electric power to the IC card unit and the function unit, and
when the detected voltage is equal to or smaller than a predetermined value, the enable instruction is issued to the IC card unit.

33. A storage medium which stores an IC card function controlling program for controlling an IC card function executed by a mobile device including an IC card unit executing the IC card function, a control unit and a function unit executing at least one of a communication function and a display function, the program executing a method comprising the steps of:
judging whether or not the IC card function can be used in accordance with an operation of the function unit, and outputting a judgment result when electric power is supplied to the control unit;
storing an enable state in response to the judgment result indicating that the IC card function can be used;
storing a disable state in response to the judgment result indicating that the IC card function cannot be used;
issuing an enable instruction or a disable instruction to the IC card unit in accordance with the stored state when electric power is not supplied to the control unit;
holding the enable state until a new judgment result is output; and
detecting a voltage of a battery unit supplying an electric power to the IC card unit and the function unit, and
when the detected voltage is equal to or smaller than a predetermined value, the enable instruction is issued to the IC card unit.

* * * * *